(12) United States Patent
Dickey et al.

(10) Patent No.: US 7,205,363 B2
(45) Date of Patent: Apr. 17, 2007

(54) POLYMERIZATION PROCESSES USING ANTISTATIC AGENTS

(75) Inventors: Randell Wayne Dickey, Baytown, TX (US); Jennifer Harting Ward, Houston, TX (US); Thomas Craig Wilson, Houston, TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 317 days.

(21) Appl. No.: 10/828,490

(22) Filed: Apr. 20, 2004

(65) Prior Publication Data

US 2004/0254316 A1 Dec. 16, 2004

Related U.S. Application Data

(60) Provisional application No. 60/477,565, filed on Jun. 11, 2003.

(51) Int. Cl.
- *C08F 4/6392* (2006.01)
- *C08F 4/64* (2006.01)
- *C08F 4/642* (2006.01)
- *C08F 4/647* (2006.01)

(52) U.S. Cl. ............ 526/135; 526/129; 526/140; 526/141; 526/160; 526/943

(58) Field of Classification Search ........... 526/160, 526/129, 137, 943, 135, 140, 141
See application file for complete search history.

(56) References Cited

U.S. PATENT DOCUMENTS

| | | | |
|---|---|---|---|
| 3,919,185 A | 11/1975 | Takebe et al. | 260/93.7 |
| 4,012,574 A | 3/1977 | Jones et al. | 526/74 |
| 5,026,795 A | 6/1991 | Hogan | 526/74 |
| 5,414,064 A | 5/1995 | Lux et al. | |
| 5,643,847 A | 7/1997 | Walzer, Jr. | 502/117 |
| 5,972,823 A | 10/1999 | Walzer, Jr. | 502/152 |
| 6,022,935 A | 2/2000 | Fischer et al. | 526/129 |
| 6,143,686 A | 11/2000 | Vizzini et al. | 502/152 |
| 6,228,795 B1 | 5/2001 | Vizzini | 502/155 |
| 6,368,999 B1 | 4/2002 | Speca | 502/402 |
| 6,562,924 B2 | 5/2003 | Benazouzz et al. | 526/201 |
| 6,833,338 B2 * | 12/2004 | McDaniel et al. | 502/104 |
| 2002/0091208 A1 | 7/2002 | Benazouzz et al. | 526/88 |
| 2005/0159300 A1* | 7/2005 | Jensen et al. | 502/103 |

FOREIGN PATENT DOCUMENTS

| | | |
|---|---|---|
| EP | 0 453 116 | 10/1991 |
| EP | 0 811 638 | 12/1997 |
| EP | 0 969 019 A | 1/2000 |
| WO | WO 96/11960 | 4/1996 |
| WO | WO 99/67307 | 12/1999 |
| WO | WO 00/05277 | 2/2000 |
| WO | WO 00/68274 | 11/2000 |
| WO | WO 01/83498 | 11/2001 |
| WO | WO 01/90239 | 11/2001 |

* cited by examiner

*Primary Examiner*—Caixia Lu

(57) ABSTRACT

The invention relates to a process for the polymerization of olefins using an antistatic agent. In particular, the invention relates to a polymerization process to produce propylene polymers using a supported metallocene catalyst system and an antistatic agent. The antistatic agent may also be contacted with a scavenger prior to polymerization.

26 Claims, No Drawings

POLYMERIZATION PROCESSES USING ANTISTATIC AGENTS

CROSS REFERENCE TO RELATED APPLICATION

This application claims the benefit of Provisional Application No. 60/477,565 filed Jun. 11, 2003, the disclosure of which is incorporated by reference.

FIELD OF THE INVENTION

The invention relates to a process for the polymerization of olefins using an antistatic agent. In particular, the invention relates to a polymerization process to produce propylene polymers using a supported metallocene catalyst system and antistatic agent. The antistatic agent may also be contacted with a scavenger prior to polymerization.

BACKGROUND

It is desirable in many olefin polymerization processes, particularly a slurry phase or gas phase process, to use a supported catalyst system. A particularly useful catalyst system typically includes a metallocene catalyst and an alumoxane supported on a carrier, such as silica. (See, e.g., U.S. Pat. Nos. 5,643,847, 5,972,823, 6,143,686, 6,228,795, and 6,368,999).

While all these supported catalyst systems are useful, it would be desirable to have an improved catalyst system or process which in producing polymers resists fouling the reactor. Particularly in a slurry or gas phase polymerization processes, there is a tendency for reactor operation problems during polymerization. During a typical polymerization process, polymer within the reactor often accumulates and clings or sticks to the walls of a reactor. After a relatively short period of time during polymerization, polymer foulant formed from the aggregation of polymers begins to appear in the reactor, and this foulant can break free and plug product discharge systems forcing shutdown of the reactor.

The accumulation of polymer particles on the reactor surfaces and internals of the reactor and cooling system results in many problems. Of particular importance is the problem of poor heat transfer during the polymerization process. The foulant can trap heat along the reactor wall by the retardation of the normal convective forces that dissipate heat in the reactor.

Therefore, it would be highly desirable to have an improved polymerization catalyst system or polymerization process that would significantly enhance reactor operability while minimizing reactor fouling.

The prior art contains a number of different teachings regarding the minimization of fouling and sheeting in commercial scale, continuous olefin polymerization processes. For example, U.S. Pat. No. 6,022,935 to Fisher et al. discloses the preparation of polymers of alk-1-enes in the presence of a supported metallocene catalyst system and an antistatic agent. The preparation is performed from −50 to 300° C. and from 0.5 to 3000 bar in the presence of the catalyst system. The antistatic agent is preferably Stadis 450. It is used as a solution, preferably from 1 to 50, or particularly preferably from 5 to 25, % by weight of the solution, based on the mass of the supported catalyst used (carrier, metallocene complex and compound forming metallocenium ions). However, Fisher teaches that the required amounts of antistatic agent may vary within wide ranges of polymerization conditions and antistatic concentration depending on the type of antistatic agent used.

U.S. Patent Application Publication No. 2002/0091208 A1 to Benazouzz et al. discloses a process for the gas-phase (co-)polymerization of olefins in a fluidised bed reactor using a metallocene catalyst in the presence of an antistatic agent. In particular, Benazouzz discloses a process for the gas-phase (co-)polymerization of olefins in a fluidised bed reactor using a metallocene catalyst in the presence of an antistatic agent characterized in that the antistatic agent comprises at least one of the components selected from: (1) a polysulfone copolymer, (2) a polymeric polyamine, and (3) an oil-soluble sulfonic acid. Benazouzz teaches a wide variety of polymer products. Among them are linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene. Additionally, it teaches that when liquid condenses out of the recycle gaseous stream, it can be a condensable monomer, e.g., but-1-ene, hex-1-ene, 4-methylpent-1-ene or octene used as a comonomer, and/or an optional inert condensable liquid, e.g. inert hydrocarbon(s), such as $C_4$–$C_8$ alkane(s) or cycloalkane(s), particularly butane, pentane or hexane.

Other background references include U.S. Pat. Nos. 6,562,924, 5,026,795, 4,012,574, WO 01/90239, WO 01/83498, WO 00/68274, WO 00/05277, WO 99/67307, WO 96/11960, EP 0 811 638 A, and EP 0 453 116 A.

However, past attempts have failed to adequately teach optimized polymerization processes for propylene polymer production that enhance reactor operability while minimizing reactor fouling. The invention solves these problems by using low levels of antistatic agent during polymerization while maintaining optimized process conditions. Additionally, the invention further solves these problems by contacting the antistatic agent with a scavenger before contacting monomers and/or the catalyst system.

SUMMARY OF THE INVENTION

The invention includes a process for the polymerization of olefins using an antistatic agent. In particular, the invention includes a polymerization process to produce propylene polymers using a supported metallocene catalyst system and an antistatic agent. The antistatic agent may also be contacted with a scavenger prior to polymerization.

In one embodiment, the invention provides for a polymerization process including contacting (a) a catalyst system; (b) monomers; and (c) an antistatic agent; in a reactor under polymerization conditions.

In another embodiment, the invention provides for a contact product of components comprising: (a) a catalyst system; (b) an antistatic agent; and (c) monomers.

In yet another embodiment, the invention provides for a process for continuous gas phase polymerization of propylene polymers in a reactor, the process comprising contacting: (a) a catalyst system comprising a metallocene catalyst system; (b) monomers; and (c) an antistatic agent comprising a polysulfone copolymer, a polymeric polyamine, an oil-soluble sulfonic acid, or mixtures thereof.

In one embodiment, the invention provides for a process for continuous slurry polymerization to produce propylene polymers in a reactor, the process comprising contacting: (a) a catalyst system comprising a metallocene catalyst system; (b) monomers; and (c) an antistatic agent comprising at least one of the components selected from the group consisting of a polysulfone copolymer, a polymeric polyamine, oil-soluble sulfonic acid, or mixtures thereof.

In another embodiment, the invention provides for a method to reduce fouling in a reactor comprising the step of: (a) adding propylene monomers into the reactor; (b) adding a catalyst system comprising a metallocene catalyst system; (c) adding an antistatic agent; and (d) forming a polymer in the reactor.

In yet another embodiment, the invention provides for a continuous process for polymerizing olefin monomers in a reactor under polymerization conditions, the continuous process comprising the steps of: (a) adding olefin monomers into the reactor; (b) adding a catalyst system; (c) adding an antistatic agent; and (d) forming a polymer in the reactor.

In any of the previous embodiments, the antistatic agent may be contacted with a scavenger, preferably an aluminum alkyl compound, and even more preferably triethylaluminum, trimethylaluminum, tri-isobutylaluminum, tri-n-hexylaluminum, diethyl aluminum chloride, and mixtures thereof. In any of the previous embodiments, the antistatic agent may be contacted with triethylaluminum.

In any of the previous embodiments, the antistatic agent may include a polysulfone copolymer, a polymeric polyamine, an oil-soluble sulfonic acid, or mixtures thereof.

In any of the previous embodiments, the antistatic agent is present from about 0.1 to about 40 ppm based on the weight of the monomers introduced into the reactor.

In any of the previous embodiments, unless explicitly stated otherwise, the antistatic agent is present from about 0.1 to about 5 ppm based on the weight of the monomers introduced into the reactor.

In any of the previous embodiments, unless explicitly stated otherwise, the antistatic agent is present from about 0.3 to about 0.8 ppm based on the weight of the monomers introduced into the reactor.

In any of the previous embodiments, the catalyst system may comprise, unless otherwise specified, a metallocene catalyst system; a Ziegler-Natta catalyst system; or mixtures thereof.

DETAILED DESCRIPTION

Various specific embodiments, versions and examples of the invention will now be described, including preferred embodiments and definitions that are adopted herein for purposes of understanding the claimed invention. However, for purposes of determining infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

As used herein, the new numbering scheme for the Periodic Table of Elements Groups are used as in HAWLEY'S CONDENSED CHEMICAL DICTIONARY 852 (John Wiley & Sons, 13th ed. 1997).

As used herein, the term "polypropylene polymer(s)" or "propylene polymer(s)" refers to homopolymers, copolymers, terpolymers, and interpolymers made from propylene derived units.

As used herein, unless differentiated, "polymerization" includes homopolymerization, copolymerization, terpolymerization, and interpolymerization.

As used herein, "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR.

As used herein, "molecular weight" means weight average molecular weight (Mw). Mw is determined using Gel Permeation Chromatography. Molecular Weight Distribution (MWD) means Mw divided by number average molecular weight (Mn). (For more information, see U.S. Pat. No. 4,540,753 to Cozewith et al. and references cited therein, and in Verstrate et al., 21 *Macromolecules* 3360 (1998)). The "Mz" value is the high average molecular weight value, calculated as discussed by A. R. Cooper in CONCISE ENCYCLOPEDIA OF POLYMER SCIENCE AND ENGINEERING 638–39 (J. I. Kroschwitz, ed. John Wiley & Sons 1990).

For purposes of the invention, the melting point (Tm) is determined by differential scanning calorimetry (DSC). For example, the method proceeds as follows. From 6 to 10 mg of a sheet of the polypropylene polymer is pressed at approximately 200° C. to 230° C. and is removed with a punch die. The sample is then annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 185° C., and occurs between the temperatures of 0° C. and 200° C. The thermal output in joules is a measure of the heat of fusion. The melting point is recorded as the temperature of the greatest heat absorption within the range of melting of the sample. This is called the first melt. The sample is then cooled at a rate of 10° C./min to 25° C. The non-isothermal crystallization temperature is recorded as the temperature of greatest heat generation, typically between 100° C. and 125° C. The area under the peak corresponds to the heat of crystallization. The sample is remelted by heating a second time, called the second melt, and is more reproducible than the first melt. The peak melting temperature from the second melt is recorded as the "2d Tm."

For purposes of the invention, Melt Flow Rates (MFR) are determined in accordance with ASTM D 1238-95 Condition L.

As used herein, "reactor grade" refers to polyolefin resin whose molecular weight distribution (MWD), or polydispersity, has not been substantially altered after polymerization. The term particularly includes polyolefins which, after polymerization, have not been treated, or subjected to treatment, to substantially reduce viscosity or substantially reduce average molecular weight.

As used herein, "metallocene" means one or more compounds represented by the formula $Cp_mMR_nX_q$, wherein Cp is a cyclopentadienyl ring which may be substituted, or derivative thereof which may be substituted; M is a Group 4, 5, or 6 transition metal, for example titanium, zirconium, hafnium, vanadium, niobium, tantalum, chromium, molybdenum and tungsten; R is a hydrocarbyl group or hydrocarboxy group having from one to 20 carbon atoms; X may be a halide, a hydride, an alkyl group, an alkenyl group or an arylalkyl group; and m=1–3; n=0–3; q=0–3; and the sum of m+n+q is equal to the oxidation state of the transition metal.

As used herein, "support" or "support composition" refers to compounds that are particulate and porous that may optionally be calcinated or contacted with a halogen. For example, a fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

As used herein, "metallocene catalyst system" is the product of contacting components: (1) one or more metallocenes; (2) one or more activators; and (3) optionally, one or more support compositions.

For purposes of describing the invention, abbreviations may be used including: Me=methyl, Et=ethyl, Bu=butyl, Ph=phenyl, Cp=cyclopentadienyl, Cp*=pentamethyl cyclopentadienyl, Ind=indenyl, Ti=titanium, Hf=hafnium, Zr=zirconium, O=oxygen, Si=silicon B=boron, Ta=tantalum, Nb=niobium, Ge=germanium, Mg=magnesium, Al=aluminum, Fe=iron, Th=thorium, Ga=gallium, P=phosphorus, Mo=molybdenum, Re=rhenium, and Sn=tin.

As used herein, "scavenger" is any organometallic compound which is reactive towards oxygen and/or water and/or polar compounds and which does not include the catalyst components, for example, the metallocene catalyst component, the activator, the optional carrier or the components remaining in or on the catalyst used in its preparation, for example toluene including any organometallic compounds used in the catalyst preparation.

As used herein, "contacting" the antistatic agent and the scavenger refers to contacting the antistatic agent and the scavenger together prior to contacting monomers and/or the catalyst system inside or outside of the reactor.

Antistatic Agent

In accordance with the present invention, the antistatic agent comprises a polysulfone copolymer, a polymeric polyamine, and/or an oil-soluble sulfonic acid. Preferably, the antistatic agent comprises a mixture of at least two components selected from the above components. More preferably, the antistatic agent comprises a mixture of three components in a solvent. The antistatic agent is available commercially from Octel (Littleton, Colo.) under the trade name STADIS. Preferable grades include STADIS 450 or OCTASTAT 3000 and STADIS 425 or OCTASTAT 2000. Such antistatic agents have been used in other processes. (See, e.g., U.S. Pat. No. 6,022,935 to Fisher et al. and U.S. Publication No. 2002/0091208 A1 to Benazouzz et al., the disclosures of which are incorporated by reference).

In one embodiment, the antistatic agent composition of the present invention (including the solvent therefor) is added to the reactor in an amount ranging from about 0.05 to about 200 ppm, preferably from about 0.1 to about 40 ppm, more preferably from about 0.1 to about 5 ppm, preferably from about 0.1 to about 2 ppm, and even more preferably from about 0.3 to about 0.8 ppm, based on the weight of the olefin(s) introduced into the reactor.

In another embodiment, the antistatic agent is used as a solution. In a preferred case, Stadis 425 is used for the polymerization of propylene polymers at a concentration of from 0.1 to 2.5 wt % of the solution, preferably, from 0.1 to 1.5 wt % of the solution, or, preferably, from 0.2 to 1.0 wt % of the solution, based on the mass of the catalyst system. In other embodiments where the antistatic agent is used as a solution, the antistatic agent is used at concentrations of from less than 1.0 wt % of the solution, from 0.1 to 30 wt % of the solution, from 0.1 to 20 wt % of the solution, from 0.1 to 10 wt % or from 0.1 to 5.0 wt % of the solution, based on the mass of the catalyst system.

In another embodiment, the amount of antistatic agent is based on the total weight of just the polysulfone polymer, polymeric amine and oil-soluble sulfonic acid, the preferred concentration of the antistatic agent is about 0.003 to about 46, preferably from about 0.006 to about 9.2, more preferably from about 0.006 to about 1.15, and even more preferably from about 0.018 to about 0.184 parts by weight per million parts by weight of the olefin introduced into the reactor.

The antistatic agent can be added continuously or intermittently to the reactor. In a continuous polymerization process, it is preferred to continuously add the antistatic agent to the reactor. Sufficient antistatic agent is added to maintain its concentration at the desired level by methods well known in the art.

The antistatic agent may also be used in batch polymerization processes.

Catalyst System

Invention methods can use any catalyst system capable of polymerizing olefins so long as the catalyst system is sufficiently active under polymerization conditions. In a preferred embodiment, the invention employs a metallocene catalyst system.

Metallocenes

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180, 5,198,401, 5,278,119; 5,304,614; 5,324,800; 5,350,723; 5,391,790; 5,436,305 and 5,510,502, 5,643,847, 5,972,823, 6,143,686, 6,228,795, 6,319,998, 6,368,999, and WO 00/12565 each fully incorporated herein by reference.

Desirably, the metallocenes are one or more of those consistent with the formula:

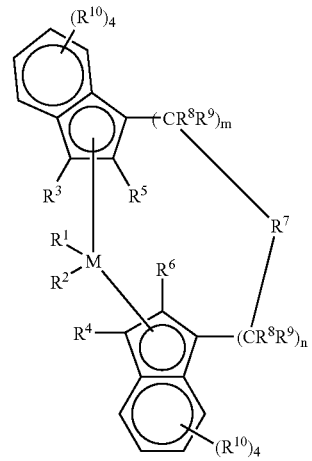

wherein M is a metal of Group 4, 5, or 6 of the Periodic Table desirably, zirconium, hafnium and titanium, most desirably zirconium; $R^1$ and $R^2$ are identical or different, desirably identical, and are one of a hydrogen atom, a $C_1$–$C_{10}$ alkyl group, desirably a $C_1$–$C_3$ alkyl group, a $C_1$–$C_{10}$ alkoxy group, desirably a $C_1$–$C_3$ alkoxy group, a $C_6$–$C_{10}$ aryl group, desirably a $C_6$–$C_8$ aryl group, a $C_6$–$C_{10}$ aryloxy group, desirably a $C_6$–$C_8$ aryloxy group, a $C_2$–$C_{10}$ alkenyl group, desirably a $C_2$–$C_4$ alkenyl group, a $C_7$–$C_{40}$ arylalkyl group, desirably a $C_7$–$C_{10}$ arylalkyl group, a $C_7$–$C_{40}$ alkylaryl group, desirably a $C_7$–$C_{12}$ alkylaryl group, a $C_8$–$C_{40}$ arylalkenyl group, desirably a $C_8$–$C_{12}$ arylalkenyl group, or a halogen atom, desirably chlorine; $R^5$ and $R^6$ are identical or different, desirably identical, are one of a halogen atom, desirably a fluorine, chlorine or bromine atom, a $C_1$–$C_{10}$ alkyl group, desirably a $C_1$–$C_4$ alkyl group, which may be halogenated, a $C_6$–$C_{10}$ aryl group, which may be halogenated, desirably a $C_6$–$C_8$ aryl group, a $C_2$–$C_{10}$ alkenyl group, desirably a $C_2$–$C_4$ alkenyl group, a $C_7$–$C_{40}$-arylalkyl group, desirably a $C_7$–$C_{10}$ arylalkyl group, a $C_7$–$C_{40}$ alkylaryl group, desirably a $C_7$–$C_{12}$ alkylaryl group, a $C_8$–$C_{40}$ arylalkenyl group, desirably a $C_8$–$C_{12}$ arylalkenyl group, a $-NR_2^{15}$, $-SR^{15}$, $-OR^{15}$, $-OSiR_3^{15}$ or $-PR_2^{15}$ radical, wherein $R^{15}$ is one of a halogen atom, desirably a chlorine atom, a $C_1$–$C_{10}$ alkyl group, desirably a $C_1$–$C_3$ alkyl group, or a $C_6$–$C_{10}$ aryl group, desirably a $C_6$–$C_9$ aryl group; $R^7$ is

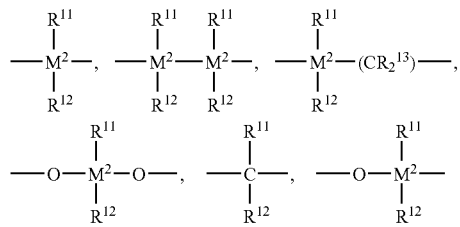

$-B(R^{11})-$, $-Al(R^{11})-$, $-Ge-$, $-Sn-$, $-O-$, $-S-$, $-SO-$, $-SO_2-$, $-N(R^{11})-$, $-CO-$, $-P(R^{11})-$, or $-P(O)(R^{11})-$; wherein $R^{11}$, $R^{12}$ and $R^{13}$ are identical or different and are a hydrogen atom, a halogen atom, a $C_1$–$C_{20}$ alkyl group, desirably a $C_1$–$C_{10}$ alkyl group, a $C_1$–$C_{20}$ fluoroalkyl group, desirably a $C_1$–$C_{10}$ fluoroalkyl group, a $C_6$–$C_{30}$ aryl group, desirably a $C_6$–$C_{20}$ aryl group, a $C_6$–$C_{30}$ fluoroaryl group, desirably a $C_6$–$C_{20}$ fluoroaryl group, a $C_1$–$C_{20}$ alkoxy group, desirably a $C_1$–$C_{10}$ alkoxy group, a $C_2$–$C_{20}$ alkenyl group, desirably a $C_2$–$C_{10}$ alkenyl group, a $C_7$–$C_{40}$ arylalkyl group, desirably a $C_7$–$C_{20}$ arylalkyl group, a $C_8$–$C_{40}$ arylalkenyl group, desirably a $C_8$–$C_{22}$ arylalkenyl group, a $C_7$–$C_{40}$ alkylaryl group, desirably a $C_7$–$C_{20}$ alkylaryl group or $R^{11}$ and $R^{12}$, or $R^{11}$ and $R^{13}$, together with the atoms binding them, can form ring systems;
$M^2$ is silicon, germanium or tin, desirably silicon or germanium, most desirably silicon;
$R^8$ and $R^9$ are identical or different and have the meanings stated for $R^{11}$;
m and n are identical or different and are zero, 1 or 2, desirably zero or 1, m plus n being zero, 1 or 2, desirably zero or 1; and
the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring system, desirably a ring system containing from about 4–6 carbon atoms.

Alkyl refers to straight or branched chain substituents. Halogen (halogenated) refers to fluorine, chlorine, bromine or iodine atoms, desirably fluorine or chlorine.

Particularly desirable transition metal compounds are compounds of the structures (A) and (B):

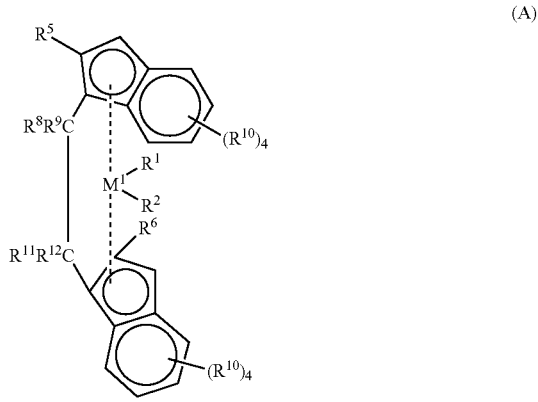

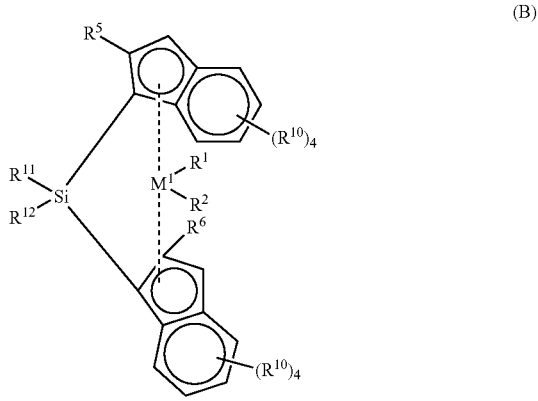

wherein:
$M^1$ is Zr or Hf, $R^1$ and $R^2$ are methyl or chlorine, and $R^5$, $R^6$, $R^8$, $R^9$, $R^{10}$, $R^{11}$ and $R^{12}$ have the above-mentioned meanings.

Illustrative but non-limiting examples of desirable transition metal compounds include: Dimethylsilandiylbis (2-methyl-4-phenyl-1-indenyl)Zirconium dimethyl; Dimethylsilandiylbis(2-methyl-4,5-benzoindenyl) Zirconium dimethyl; Dimethylsilandiylbis(2-methyl-4,6-diisopropylindenyl) Zirconium dimethyl; Dimethylsilandiylbis(2-ethyl-4-phenyl-1-indenyl) Zirconium dimethyl; Dimethylsilandiylbis (2-ethyl-4-naphthyl-1-indenyl) Zirconium dimethyl; Phenyl(methyl)silandiylbis(2-methyl-4-phenyl-1-indenyl) Zirconium dimethyl; Dimethylsilandiylbis(2-methyl-4-(1-naphthyl)-1-indenyl) Zirconium dimethyl; Dimethylsilandiylbis(2-methyl-4-(2-naphthyl)-1-indenyl) Zirconium dimethyl; Dimethylsilandiylbis(2-methyl-indenyl) Zirconium dimethyl; Dimethylsilandiylbis(2-methyl-4,5-diisopropyl-1-indenyl) Zirconium dimethyl; Dimethylsilandiylbis(2,4,6-trimethyl-1-indenyl) Zirconium dimethyl; Phenyl(methyl) silandiylbis(2-methyl-4,6-diisopropyl-1-indenyl)Zirconium dimethyl; 1,2-Ethandiylbis(2-methyl-4,6-diisopropyl-1-indenyl) Zirconium dimethyl; 1,2-Butandiylbis(2-methyl-4,6-diisopropyl-1-indenyl) Zirconium dimethyl; Dimethylsilandiylbis(2-methyl-4-ethyl-1-indenyl) Zirconium dimethyl;

Dimethylsilandiylbis(2-methyl-4-isopropyl-1-indenyl) Zirconium dimethyl; Dimethylsilandiylbis(2-methyl-4-t-butyl-1-indenyl) Zirconium dimethyl; Phenyl(methyl)silandiylbis(2-methyl-4-isopropyl-1-indenyl)Zirconium dimethyl; Dimethylsilandiylbis(2-ethyl-4-methyl-1-indenyl) Zirconium dimethyl; Dimethylsilandiylbis(2,4-dimethyl-1-indenyl) Zirconium dimethyl; Dimethylsilandiylbis(2-methyl-4-ethyl-1-indenyl) Zirconium dimethyl; Dimethylsilandiylbis(2-methyl-α-acenaphth-1-indenyl) Zirconium dimethyl; Phenyl(methyl)silandiylbis(2-methyl-4,5-benzo-1-indenyl) Zirconium dimethyl; Phenyl(methyl)silandiylbis(2-methyl-4,5-(methylbenzo)-1-indenyl)Zirconium dimethyl; Phenyl(methyl)silandiylbis(2-methyl-4,5-(tetramethylbenzo)-1-indenyl)Zirconium dimethyl; Phenyl(methyl)silandiylbis(2-methyl-a-acenaphth-1-indenyl)Zirconium dimethyl; 1,2-Ethandiylbis(2-methyl-4,5-benzo-1-indenyl) Zirconium dimethyl; 1,2-Butandiylbis(2-methyl-4,5-benzo-1-indenyl) Zirconium dimethyl; Dimethylsilandiylbis(2-methyl-4,5-benzo-1-indenyl) Zirconium dimethyl; 1,2-Ethandiylbis(2,4,7-trimethyl-1-indenyl) Zirconium dimethyl; Dimethylsilandiylbis(2-methyl-1-indenyl) Zirconium dimethyl; 1,2-Ethandiylbis(2-methyl-1-indenyl) Zirconium dimethyl; Phenyl(methyl)silandiylbis(2-methyl-1-indenyl) Zirconium dimethyl; Diphenylsilandiylbis(2-methyl-1-indenyl) Zirconium dimethyl; 1,2-Butandiylbis(2-methyl-1-indenyl) Zirconium dimethyl; Dimethylsilandiylbis(2-ethyl-1-indenyl) Zirconium dimethyl; Dimethylsilandiylbis(2-methyl-5-isobutyl-1-indenyl) Zirconium dimethyl; Phenyl(methyl)silandiylbis(2-methyl-5-isobutyl-1-indenyl) Zirconium dimethyl; Dimethylsilandiylbis(2-methyl-5-t-butyl-1-indenyl) Zirconium dimethyl; Dimethylsilandiylbis(2,5,6-trimethyl-1-indenyl) Zirconium dimethyl; Dimethylsilandiylbis(2-methyl-4-phenyl-1-indenyl)Zirconium dichloride; Dimethylsilandiylbis(2-methyl-4,5-benzoindenyl) Zirconium dichloride; Dimethylsilandiylbis(2-methyl-4,6-diisopropyl-indenyl) Zirconium dichloride; Dimethylsilandiylbis(2-ethyl-4-phenyl-1-indenyl) Zirconium dichloride; Dimethylsilandiylbis (2-ethyl-4-naphthyl-1-indenyl) Zirconium dichloride; Phenyl(methyl)silandiylbis(2-methyl-4-phenyl-1-indenyl) Zirconium dichloride; Dimethylsilandiylbis(2-methyl-4-(1-naphthyl)-1-indenyl) Zirconium dichloride; Dimethylsilandiylbis(2-methyl-4-(2-naphthyl)-1-indenyl) Zirconium dichloride; Dimethylsilandiylbis(2-methyl-indenyl) Zirconium dichloride, Dimethylsilandiylbis(2-methyl-4,5-diisopropyl-1-indenyl) Zirconium dichloride; Dimethylsilandiylbis(2,4,6-trimethyl-1-indenyl) Zirconium dichloride; Phenyl(methyl)silandiylbis(2-methyl-4,6-diisopropyl-1-indenyl) Zirconium dichloride; 1,2-Ethandiylbis(2-methyl-4,6-diisopropyl-1-indenyl) Zirconium dichloride; 1,2-Butandiylbis(2-methyl-4,6-diisopropyl-1-indenyl) Zirconium dichloride; Dimethylsilandiylbis(2-methyl-4-ethyl-1-indenyl) Zirconium dichloride; Dimethylsilandiylbis(2-methyl-4-isopropyl-1-indenyl) Zirconium dichloride; Dimethylsilandiylbis(2-methyl-4-t-butyl-1-indenyl) Zirconium dichloride; Phenyl(methyl)silandiylbis(2-methyl-4-isopropyl-1-indenyl) Zirconium dichloride; Dimethylsilandiylbis(2-ethyl-4-methyl-1-indenyl) Zirconium dichloride; Dimethylsilandiylbis(2,4-dimethyl-1-indenyl) Zirconium dichloride; Dimethylsilandiylbis(2-methyl-4-ethyl-1-indenyl) Zirconium dichloride; Dimethylsilandiylbis(2-methyl-α-acenaphth-1-indenyl) Zirconium dichloride; Phenyl(methyl)silandiylbis(2-methyl-4,5-benzo-1-indenyl) Zirconium dichloride; Phenyl(methyl)silandiylbis(2-methyl-4,5-(methylbenzo)-1-indenyl) Zirconium dichloride; Phenyl(methyl)silandiylbis(2-methyl-4,5-(tetramethylbenzo)-1-indenyl) Zirconium dichloride; Phenyl(methyl)silandiylbis (2-methyl-a-acenaphth-1-indenyl) Zirconium dichloride; 1,2-Ethandiylbis(2-methyl-4,5-benzo-1-indenyl) Zirconium dichloride; 1,2-Butandiylbis(2-methyl-4,5-benzo-1-indenyl) Zirconium dichloride; Dimethylsilandiylbis(2-methyl-4,5-benzo-1-indenyl) Zirconium dichloride; 1,2-Ethandiylbis(2,4,7-trimethyl-1-indenyl) Zirconium dichloride; Dimethylsilandiylbis(2-methyl-1-indenyl) Zirconium dichloride; 1,2-Ethandiylbis(2-methyl-1-indenyl) Zirconium dichloride; Phenyl(methyl)silandiylbis(2-methyl-1-indenyl) Zirconium dichloride; Diphenylsilandiylbis(2-methyl-1-indenyl) Zirconium dichloride; 1,2-Butandiylbis(2-methyl-1-indenyl) Zirconium dichloride; Dimethylsilandiylbis(2-ethyl-1-indenyl) Zirconium dichloride; Dimethylsilandiylbis(2-methyl-5-isobutyl-1-indenyl) Zirconium dichloride; Phenyl(methyl)silandiylbis(2-methyl-5-isobutyl-1-indenyl) Zirconium dichloride; Dimethylsilandiylbis(2-methyl-5-t-butyl-1-indenyl) Zirconium dichloride; Dimethylsilandiylbis(2,5,6-trimethyl-1-indenyl) Zirconium dichloride; and mixtures thereof.

Many of these desirable transition metal compound components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970 all of which are herein fully incorporated by reference.

Additionally, metallocenes such as those described in U.S. Pat. Nos. 5,510,502, 4,931,417, 5,532,396, 5,543,373, WO 98/014585, EP 6 11 773 and WO 98/22486 are suitable for use in this invention.

Supports

Supports suitable for use in this invention are generally porous materials and can include organic materials, inorganic materials and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof.

Particulate silicon dioxide materials are well known and are commercially available from a number of commercial suppliers. Desirably the silicon dioxide used herein is porous and has a surface area in the range of from about 10 to about 700 m$^2$/g, a total pore volume in the range of from about 0.1 to about 4.0 cc/g and an average particle diameter in the range of from about 10 to about 500 μm. More desirably, the surface area is in the range of from about 50 to about 500 m$^2$/g, the pore volume is in the range of from about 0.5 to about 3.5 cc/g and the average particle diameter is in the range of from about 15 to about 150 μm. Most desirably the surface area is in the range of from about 100 to about 400 m$^2$/g, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

Fluorine Compounds

The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of $NH_4BF_4$, $(NH_4)_2SiF_6$, $NH_4 PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are more desirable.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to the vessel for dehydration or calcining the support. Accordingly, the fluorine concentration present on the support is in the range of from 0.6 to 3.5 wt % of support.

Another method of treating the support with the fluorine compound is to dissolve the fluorine in a solvent, such as water, and then contact the support with the fluorine containing solution. When water is used and silica is the support, it is desirable to use a quantity of water which is less than the total pore volume of the support.

Dehydration or calcining of the silica is not necessary prior to reaction with the fluorine compound. Desirably the reaction between the silica and fluorine compound is carried out at a temperature of from about 100° C. to about 1000° C., and more desirably from about 200° C. to about 600° C. for about two to eight hours.

In one embodiment, the resulting support composition may be generically represented by the formula:

Sup F

"Sup" is a support, "F" is a fluorine atom bound to the support. The fluorine atom may be bound, directly or indirectly, chemically or physically to the support. An example of chemical or physical bonding would be covalent and ionic bonding, respectively. The support composition desirably may be a fluorided support composition.

In another embodiment, the resulting support composition, such as a fluorided support composition, may be generically represented by the formula:

Sup L $F_n$

"Sup" is a support selected from the group which includes talc, clay, silica, alumina, magnesia, zirconia, iron oxides, boria, calcium oxide, zinc oxide, barium oxide, thoria, aluminum phosphate gel, polyvinylchloride and substituted polystyrene.

"L" is a first member selected from the group which includes (i) bonding, sufficient to bound the F to the Sup; (ii) B, Ta, Nb, Ge, Ga, Sn, Si, P, Ti, Mo, Re, or Zr bound to the Sup and to the F; and (iii) O bound to the Sup and bound to a second member selected from the group consisting of B, Ta, Nb, Ge, Ga, Sn, Si, P, Ti, Mo, Re, or Zr which is bound to the F;

"F" is a fluorine atom; and

"n" is a number from 1–7.

An example of such bonding sufficient to bound the F to the Sup would be chemical or physical bonding, such as, for example, covalent and ionic bonding. The support composition desirably may be a fluorided support composition.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alkylalumoxanes such as methylalumoxane (MAO) are commonly used as metallocene activators. Generally alkylalumoxanes contain about 5 to 40 of the repeating units:

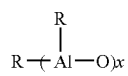

$AlR_2$ for linear species; and

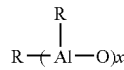

for cyclic species where R is a $C_1$–$C_8$ alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO 94/10180, each fully incorporated herein by reference. (as used herein unless otherwise stated "solution" refers to any mixture including suspensions.)

Ionizing activators may also be used to activate metallocenes. These activators are neutral or ionic, or are compounds such as tri(n-butyl)ammonium tetrakis(pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) borane. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. No. 5,643,847, U.S. patent application Ser. No. 09184358, filed Nov. 2, 1998 and U.S. patent application Ser. No. 09184389, filed Nov. 2, 1998 (all fully incorporated herein by reference). When using the support composition, and particularly the fluorided support composition, of this invention, these NCA support methods generally comprise using neutral anion precursors that are sufficiently strong Lewis acids to react with the hydroxyl reactive functionalities present on the silica surface such that the Lewis acid becomes covalently bound.

In one embodiment of this invention, the activator is one or more NCAs and the supportation method described above is used. This reaction can be generically represented by the chemical formula:

$$[L_nL'_mM'R']^+[LA\text{-}O\text{-}SupLF_n]^-, \qquad (1),$$

where $[L_nL'_mM'R']^+$ is the catalytically active transition metal cation and LA-O— is the activator anion bound to the support composition, particularly the fluorided support composition, $SupLF_n$. More specifically, $L_n$ is one or more ligands (n equals $d^0$–1 where $d^0$ is the highest oxidation state of M') covalently bound to M', $L'_m$ is a neutral, non-oxidizing ligand having a dative bond to M' (typically m equals 0 to 3), M' is a Group 4, 5, 6, 9, or 10 transition metal, R' is a ligand having a σ bond to M' into which a polymerizable monomer or macromonomer can insert for coordination polymerization. LA is a Lewis acid that is capable of forming the anionic activator and O is oxygen.

The activator anion neutral precursors that serve as the Lewis acid (LA) include any of the noncoordinating anion precursors of sufficient acidity to accept the available electron pair of the hydroxyl group oxygen atom and facilitate the protonation of the transition metal compound or a secondary proton acceptor (see below) by the silanol group proton. The desirable activator anion neutral precursors that serve as the Lewis acid (LA) are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., tris-perfluorophenyl borane, trisperfluoronaphthyl borane, trisperfluorobiphenyl borane. These precursors therefore should not possess any reactive ligands, which can be protonated by any remaining hydroxyl groups on the support composition, particularly the fluorided support composition. For example, any Group 13 element based Lewis acids having only alkyl, halo, alkoxy, and/or amido ligands, which are readily hydrolyzed in aqueous media, may not be suitable. At least one ligand of LA must be sufficiently electron-withdrawing to achieve the needed acidity, for example, tris-perfluorophenyl borane, under typical reaction conditions. Typical metal/metalloid centers for LA will include boron, aluminum, antimony, arsenic, phosphorous and gallium. Most desirably LA is a neutral compound comprising a Group 13 metalloid center with a complement of ligands together sufficiently electron-withdrawing such that the Lewis acidity is greater than or equal to that of $AlCl_3$. Examples include tris-perfluorophenylborane, tris(3,5-di(trifluoromethyl)phenyl)borane, tris(di-t-butylmethylsilyl)perfluorophenylborane, and other highly fluorinated tris-arylborane compounds.

Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Ziegler-Natta Catalysts

Traditional Ziegler-Natta catalysts can be used in invention processes. Ziegler-Natta catalysts are typically composed of a transition metal compound from groups 4–7 and an organometallic compound of a metal from groups 11–13 of the periodic table. Well-known examples include $TiCl_3$-$Et_2AlCl$, $AlR_3$—$TiCl_4$. Et is an ethyl group; R represents an alkyl group. These catalysts include mixtures of halides of transition metals, especially titanium, chromium, vanadium, and zirconium, with organic derivatives of nontransition metals, particularly alkyl aluminum compounds.

Catalyst Mixtures

In addition to using traditional Ziegler-Natta and metallocene catalysts, invention process can employ a mixed catalyst system. A mixed catalyst system includes mixtures of Ziegler-Natta and metallocene catalysts, as well as supporting both metallocene and Ziegler-Natta components on the same support. Methods for producing mixed catalyst systems are well known in the art. Mixed catalyst systems can be employed in invention processes to alter or select desired physical or molecular properties. For example, mixed catalyst systems can control the molecular weight distribution of isotactic propylene polymers when used with invention processes.

Mixed-catalyst systems can be used with invention polymerization processes to tailor the composition distribution of copolymers with high catalyst productivity. These systems can also be used with diene incorporation to facilitate Long Chain Branching using mixed catalyst systems and high levels of vinyl terminated polymers.

Polymerization Process

The catalyst systems of the invention described above are suitable for use in any polymerization process. Polymerization techniques for olefin polymerization can be solution polymerization, slurry polymerization or gas phase polymerization techniques. Methods and apparatus for effecting such polymerization reactions are well known. Polymerization processes include solution, fixed-bed, moving-bed, fluid-bed, gas phase, slurry phase, and a high pressure process or a combination thereof, conducted in single, series, or parallel reactors. Particularly preferred continuous processes, including diluent slurry, bulk slurry (loop and stirred tank), and gas phase (stirred and fluid bed). When two or more reactors are operating in a continuous process, the multiple reactors can be all of the same type or they may be any combination of the types.

In one embodiment, the process of this invention is directed toward a slurry or gas phase polymerization process of one or more olefin monomers, having from 2 to 30 carbon atoms, preferably 3 to 12 carbon atoms, and more preferably 3 to 8 carbon atoms, and even more preferably propylene. The invention is particularly well suited to the polymerization of two or more olefin monomers of ethylene, propylene, butene-1, pentene-1,4-methyl-pentene-1, hexene-1, octene-1 and decene-1. The polymerization of propylene polymers is most preferred.

In one embodiment, propylene is polymerized with at least two different comonomers, optionally one of which may be a diene, to form a terpolymer.

In one embodiment, the invention is directed to a process, particularly a slurry phase process, for polymerizing propylene polymers alone or with one or more other monomers including ethylene, and olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110 C, and most preferably in the range of from about 70° C. to about 95° C.

A slurry polymerization process generally uses pressures in the range of from about 1 to about 50 atmospheres and even greater and temperatures in the range of 0° C. to about 120° C. In a preferred embodiment, the polymerization process uses pressures in the range of from about 23 to about 38 atmospheres, more preferably from about 24 to about 32 atmospheres and temperatures in the range of 57 to about 77° C., more preferably from about 58 to about 74° C. In a slurry polymerization, a suspension of solid, particulate polymer is formed in liquid propylene to which ethylene and comonomers and often hydrogen along with catalyst are added. The suspension including monomer is intermittently or continuously removed from the reactor where the volatile components are separated from the polymer and recycled, optionally after a distillation, to the reactor. The propylene should be liquid under the conditions of polymerization.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing one or more loop reactors and those utilizing one or more stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Scavenger

In one embodiment the antistatic agent may be used along with a scavenger. A "scavenger" is any organometallic compound which is reactive towards oxygen and/or water and/or polar compounds and which does not include the catalyst components, for example, the metallocene catalyst component, the activator, the optional carrier or the components remaining in or on the catalyst used in its preparation, for example toluene including any organometallic compounds used in the catalyst preparation. Non-limiting examples of scavenger compounds are those represented by the general formula $R_n$ M, where M is a Group 12 or 13 element, each R, which can be the same or different, is a substituted or unsubstituted, straight or branched chain alkyl radical, cyclic hydrocarbyl, alkyl-cyclohydrocarbyl radical, aromatic radical or alkoxide radical, wherein n is 2 or 3.

In another embodiment, the scavenger is a hydrocarbon aluminum compound of the formula $AlR_{(3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen or hydride for example chlorine, bromine or iodine, chlorine is preferred; a is 0, 1 or 2.

Illustrative, but non-limiting examples of such compounds of the above formula can include when M is aluminum (Al), the trialkyl aluminums such as trimethyl aluminum, triethyl aluminum, tri-n-propyl aluminum, tri-isopropyl aluminum, tri-n-butyl aluminum, tri-sec-butyl aluminum, tri-t-butyl aluminum, tri-isobutyl aluminum, tri-n-pentyl aluminum, tricyclopentyl aluminum, tri-n-hexyl aluminum, tri-(4-methylpentyl) aluminum, tri-(3-methylpentyl) aluminum, tricyclohexyl aluminum, and the like; alkyl aluminums such as dimethylethyl aluminum, methyldiethyl aluminum, ethyldimethyl aluminum, dimethyl-n-propyl aluminum, methyl di-n-propyl aluminum, dimethylisopropyl aluminum, dimethylcyclohexyl aluminum, methylethylpropyl aluminum, and the like, aryl and alkyl-substituted aluminums, such as triphenyl aluminum, tri-p-tolyl aluminum, tri-m-tolyl aluminum, tri-p-ethyl aluminum, and the like. Other non-limiting examples of typical scavengers include dialkyl aluminum halides, for instance diethylaluminum chlorides, ethyl aluminum dichlorides, bromides and iodides and dialkyl aluminum sesquichlorides, bromides and iodides; aluminum alkoxides and aryloxides such as dimethyl aluminum methoxide, dimethyl aluminum ethoxide, diethyl aluminum ethoxide, diethyl aluminum isopropoxide, methyl ethyl aluminum methoxide, dimethyl aluminum 4-methylphenoxide, demethyl aluminum 3-methylphenoxide, dimethyl aluminum 2,6-diisopropylphenoxide, dimethyl aluminum 2,6-di-t-butyl4-methylphenoxide, and the like.

A similar list of illustrative Group 13 element compounds where M is boron could be made for the trialkyl boranes, alkyl boranes, and alkyl borane alkoxides. Also a similar list could be given for the analogous compounds of gallium and indium. Such list would be nearly identical to that already presented with respect to the aluminum species and therefore such listing of the borane analogues and other Group 13 elements analogues are not necessary to a complete disclosure.

Scavengers typically preferred are those in the above formula wherein M is aluminum or boron. Of the aluminum species of Group 13 element compounds, the most often used as scavengers are trialkylaluminums, and of the trialkylaluminums the most preferred are triethylaluminum, triisobutyl aluminum and trimethylaluminum.

The most preferred scavengers are aluminum alkyl compounds, for example, triethylaluminum (TEAL), trimethylaluminum (TMAL), tri-isobutylaluminum (TIBAL) and tri-n-hexylaluminum (TNHAL) and diethyl aluminum chloride (DEAC) and the like, TEAL being the most widely used scavenger.

In one embodiment during polymerization a scavenger is present to arrest impurities in an amount less than 300 ppm, preferably less than 250 ppm, more preferably less than 200 ppm, even more preferably less than 150 ppm, still more preferably less than 100 ppm, and most preferably less than 50 ppm based on the olefin feed to the reactor(s).

In one embodiment during gas phase reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In a preferred embodiment, the scavenger is pre-contacted with the antistatic agent. The antistatic agent should be contacted with the scavenger for sufficient residence time to ensure the scavenger effectively controls catalyst poisons in the antistatic agent. Suitable methods of combining the scavenger and antistatic agent are well known in the art. Without being bound to theory, it is believed that the scavenger reacts and neutralizes any potential catalyst poison components of the antistatic agent.

Polypropylene Polymers

Although the invention provides processes suitable to polymerize olefins, a preferred embodiment is directed at the production of propylene polymers. The propylene polymers, desirably crystalline isotactic propylene polymers, include one or more homopolymers, copolymers, terpolymers, and interpolymers.

In this embodiment, the propylene polymers preferably are characterized by molecular weight distributions (MWD) in the range of from 2.0 to 20.0, preferably from 2.0 to 12.0, and preferably from 2.0 to 8.0.

The propylene polymers of this invention have weight average molecular weights (MW) that are in the range of from about 10,000 to about 2,000,000, preferably from about 25,000 to about 1,000,000, preferably from about 25,000 to about 500,000, and preferably less than 500,000. The Mz values for the propylene polymers of the present invention range from 25,000 to 2,000,000, and preferably from 50,000 to 1,500,000.

The processes of the invention produce propylene polymers with a melting point (Tm) of from 70 to 185° C., preferably from 90 to 175° C., and even more preferably from 100 to 175° C.

The propylene polymers desirably have a melt flow rate (MFR) in the range of from 0.2 dg/min to 5000 dg/min, preferably from 0.4 dg/min to 3000 dg/min, and preferably from 0.5 dg/min to 2500 dg/min. In one embodiment, the hexane extractables level (as measured by 21 CFR 177.1520 (d)(3)(i)) of the propylene polymers is desirably less than 6.4 wt %, preferably less than 4.0 wt %.

For copolymerization, terpolymerization and interpolymerization, monomers include $C_2$ to $C_{12}$ α-olefin derived units, preferably ethylene, and other α-olefin, α-olefinic diolefin, or non-conjugated diolefin monomers. Monomers also include $C_4$–$C_{20}$ diolefins and $C_4$–$C_{20}$ cyclic olefins. Other monomers include olefinically unsaturated monomers such as styrene, alkyl-substituted styrene, ethylidene norbornene, norbornadiene, dicyclopentadiene, vinylcyclohexane, vinylcyclohexene, acrylates. Monomers may also include cyclic olefins such as cyclopentene, norbornene, and alkyl-substituted norbornenes. Further, monomers may include α-olefinic macromonomers produced in-situ or added from another source.

Preferably, the comonomer is selected from the group consisting of ethylene, 1-butene, 1-pentene, 1-hexene, and 1-octene. Combinations of comonomers and substituted comonomers such as 4-methylpentene-1 can also be used. The most preferred of these comonomers are ethylene, 1-pentene, and 1-hexene.

The amount of comonomer used will depend on the type of comonomer and desired properties of the resulting propylene copolymer. The propylene copolymer may contain any amount of comonomer as long as the propylene copolymer remains crystalline. In general the amount of comonomer units based on the total weight of the propylene copolymer is in the range of from 0.05 to 15 wt %, preferably from 0.1 to 10 wt %, and preferably from 0.5 to 8 wt %, and preferably from 0.5 to 5 wt % based on the total weight of the propylene copolymer. Conversely, the propylene copolymer comprises from 99.95 to 85 wt % propylene units based on the total weight of the copolymer, preferably from 99.90 to 90 wt %, preferably from 99.5 to 92 wt %, and preferably from 99.5 to 95 wt % propylene units based on the total weight of the propylene copolymer.

In some embodiments of the invention, propylene polymers may include one or more other polymers, including but not limited to, thermoplastic polymer(s) and/or elastomer(s) blended through conventional methods well-known in the art. Additionally, the propylene polymers may be functionalized by methods also well known in the art.

INDUSTRIAL APPLICATIONS

The inventive propylene polymer compositions of the invention are extremely useful for melt blown (MB) fabrics, spunbond (SB) fabrics, injection molded articles, and films. Invention processes can be used for making spun bonded and melt blown fibers, films, and injection molded articles with the appropriate choice of catalyst and polymerization conditions.

Reference will be made to the following specific examples which is not intended to be limiting. One skilled in art will recognize that catalyst activities reported below vary depending on polymerization conditions and the specific catalyst system employed. Therefore, the following examples are only provided for illustration.

EXAMPLES

The following examples are provided to better illustrate the unexpected and surprising results of the claimed invention. Examples 2, 3, & 5 are Inventive Examples and Examples 1 & 4 are Comparative Examples. The Inventive Examples demonstrate when compared to the Comparative Examples that adding an antistatic agent at very low concentrations and contacting the antistatic agent with a scavenger resulted in minimal reactor fouling and optimal catalyst activity for the polymerization of propylene and the copolymerization of propylene with comonomer.

Preparation of the Catalyst System

Example A

A supported metallocene catalyst system used in the following examples included a metallocene on a fluorided ("F") silica support, and an non-coordinating anion ("NCA") activator, such as described in U.S. Pat. No. 6,143,686. The catalyst system was prepared as described in '686: trisperfluorophenylboron in toluene (Albemarle Corporation, Baton Rouge, La.) and N,N-diethyl aniline were combined and then mixed with fluorided silica. Rac-dimethylsilanedyl-bis(2-methyl-4-phenylindenyl)zirconium dimethyl was added. The fluorided silica is described in WO 00/12565.

Generally, to prepare the fluorided silica, $SiO_2$ (Grace Davison, a subsidiary of W. R. Grace Co., Conn.) as Sylopol® 952 ("952 silica gel") having a $N_2$ pore volume 1.63 cc/gm and a surface area of 312 $m^2$/gm, was dry mixed with 0.5 to 3 grams of ammonium hexafluorosilicate (Aldrich Chemical Company, Milwaukee, Wis.). The ammonium hexafluorosilicate added corresponds to 1.05 millimole F per gram silica gel. The mixture was transferred to a furnace and flow of $N_2$ was passed up through the frit to fluidize the silica bed. The furnace was heated according to the following schedule:

Raise the temperature from 25 to 150° C. over 5 hours
Hold the temperature at 150° C. for 4 hours
Raise the temperature from 150 to 500° C. over 2 hours
Hold the temperature at 500° C. for 4 hours
Heat off and allow to cool under $N_2$
When cool, the fluorided silica was stored under $N_2$ A sufficient amount of the catalyst system was provided to insure adequate charge for the polymerization runs. The catalyst system was oil slurried 10 parts by weight catalyst to 90 parts by weight Drakeol™ mineral oil (Penreco, Dickinson, Tex.) for ease of addition to the reactor.

Polymerization Examples

Example 1 (Comparative)

Propylene was polymerized as follows in a two reactor system. The polymerization was conducted in a pilot scale continuous stirred tank, bulk liquid phase polymerization process employing two reactors in series. The reactors were equipped with jackets for removing the heat of polymerization. The reactor temperature was set at about 50 to 75° C., with 5 to 10° C. difference between the reactors. Catalyst was fed at a rate of about 2 to 4 gm/hr. A 1 wt % solution of triethylaluminum (TEAl) in hexane was employed as a scavenger and added at a level of 20 wppm based on the weight of propylene fed to the reactor. Propylene was fed at a rate of about 100 to 110 kg/hr. Resin was removed at a rate of 50 to 100 lbs/hr. After eight days of continuous polymerization, the reaction was stopped and the reactors opened for inspection. A thick buildup of foulant was found on the agitator and baffles in one of the reactors.

Example 2 (Inventive)

Propylene was polymerized as in Example 1. A solution of Stadis® 425 was diluted in high purity hexane to a concentration of 0.024% by weight of the antistatic agent solution to the hexane diluent. This solution was mixed with the 1% by weight solution of TEAl in hexane prior to being injected into the reactor. The residence time of mixing was between four and ten minutes and the weight percentage of the antistatic agent solution (active ingredients+solvent) to catalyst solids was between 1.1 and 1.5% by weight. After approximately eight days of continuous polymerization, the reaction was stopped, reactors opened, and found to be clean and free of foulant buildup. A reduction in catalyst activity (pounds of polymer produced/pounds of catalyst consumed) of approximately 10% was observed compared to Example 1.

Example 3 (Inventive)

Polymerizations were conducted to establish two different sets of conditions without antistat that resulted in baseline catalyst activities of 12 kilograms polymer per gram catalyst solids and 25 kilograms polymer per gram catalyst solids. A series of polymerizations as described in Example 2 were conducted where the ratio of Stadis® 425 (antistatic agent) to olefin was varied to observe the impact on the baseline catalyst activity. The results are reported in Table 1 In all of these polymerizations the antistatic agent solution was mixed with the 1% by weight solution of TEAl in hexane prior to being injected into the reactor, with a mixing residence time between four and ten minutes.

Example 4 (Comparative)

Propylene was polymerized as follows in a two reactor system. The polymerization was conducted in a pilot scale continuous stirred tank, bulk liquid phase polymerization process employing two reactors in series. The reactors were equipped with jackets for removing the heat of polymerization. The reactor temperature was set at about 50 to 75° C., with 5 to 10° C. difference between the reactors. Catalyst was fed at a rate of about 1 to 3 gm/hr. A 1 wt % solution of triethylaluminum (TEAl) in hexane was employed as a scavenger and added at a level of 20 wppm. Propylene was fed at a rate of about 100 to 110 kg/hr. Resin was removed at a rate of 50 to 100 lbs/hr. The concentration of ethylene (employed as a comonomer) was varied in the reactor. After six days of continuous polymerization the reactors were shutdown due to plugging problems in the discharge system. The reactors were opened for inspection. A thick coat of foulant buildup was found on the agitator, baffles, and walls of one of the reactors.

Example 5 (Inventive)

Propylene was polymerized as in Example 4. The concentration of ethylene (employed as a comonomer) was varied in the reactor. A solution of Stadis® 425 was diluted in high purity hexane to a concentration of 0.06% by weight of the antistatic agent solution to the hexane diluent. This solution was mixed with the 1% by weight solution of TEAl in hexane prior to being injected into the reactor. The residence time of mixing was between four and ten minutes and the weight percentage of the antistatic agent solution (active ingredients+solvent) to catalyst solids was between 5.2 and 7.7% by weight. After approximately seven days of continuous polymerization, the reaction was stopped, reactors opened, and found to be clean and free of foulant build-up.

TABLE 1

Catalyst Activity Observations

| Ratio of Stadis ® 425 to olefin feed | Percent of baseline activity observed |
|---|---|
| 12.5 weight parts per million | Small |
| 7.5 weight parts per million | Small |
| 3 weight parts per million | ~19% |
| 2 weight parts per million | ~58% |
| 1.65 weight parts per million | ~75% |
| 1.6 weight parts per million | ~72% |
| 1.45 weight parts per million | ~96% |
| 1.35 weight parts per million | Between 76 and 100% |
| 1 weight parts per million | ~89% |
| 0.8 weight parts per million | ~90% |
| 0.6 weight parts per million | ~100% |
| 0.4 weight parts per million | ~100% |

As demonstrated, Inventive Examples 2, 3, & 5 show that catalyst activity is optimized at low levels of the antistatic agent complexed with scavenger.

Percent of baseline catalyst activity observed is within the range having an upper limit of 100%, or 99%, or 98%, or 95%, or 90%, or 85%, or 80%, and a lower limit of 40%, or 45%, or 50%, or 55%, or 60%, or 65%.

Trade names used herein are indicated by a ™ symbol, indicating that the names may be protected by certain trademark rights. Some such names may also be registered trademarks in various jurisdictions.

All patents and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. A polymerization process comprising contacting:
   (a) a catalyst system;
   (b) monomers comprising at least 85 wt % propylene monomers by total weight of the monomers; and
   (c) an antistatic agent that has been pre-contacted with a scavenger;
   in a reactor under polymerization conditions;
   wherein the antistatic agent is present from about 0.3 to 1.5 ppm based on the weight of the monomers introduced into the reactor.

2. The polymerization process of claim 1, wherein the polymerization process is selected from the group consisting of continuous gas phase polymerization processes, continuous slurry polymerization processes and continuous polymerization processes.

3. The polymerization process of claim 1, wherein the scavenger comprises an aluminum alkyl compound.

4. The polymerization process of claim 3, wherein the aluminum alkyl compound is selected from the group consisting of triethylaluminum, trimethylaluminum, tri-isobutylaluminum, tri-n-hexylaluminum, diethyl aluminum chloride, and mixtures thereof.

5. The polymerization process of claim 4, wherein the aluminum alkyl compound is triethylaluminum.

6. The polymerization process of claim 1, wherein the antistatic agent comprises a polysulfone copolymer, a polymeric polyamine, an oil-soluble sulfonic acid, or mixtures thereof, with or without a solvent.

7. The polymerization process of claim 1, wherein the antistatic agent is present from about 0.3 to about 0.8 ppm based on the weight of the monomers introduced into the reactor.

8. The polymerization process of claim 1, wherein the catalyst system comprises a supported metallocene catalyst system.

9. The polymerization process of claim 1, wherein the catalyst system comprises a supported metallocene catalyst system comprising a support and a metallocene, the metallocene represented by the following:

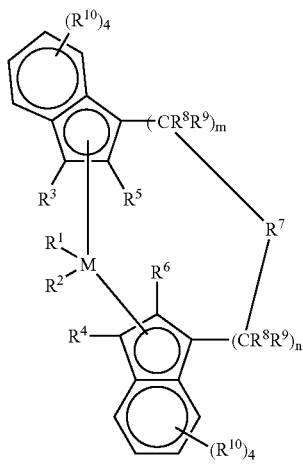

wherein M is a metal of Group 4, 5, or 6 of the Periodic Table;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, and are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

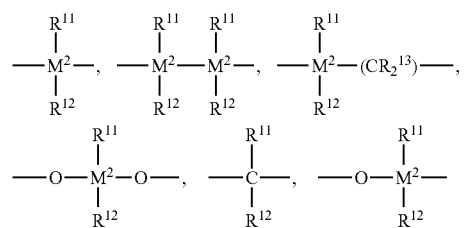

—B($R^{11}$), —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ flouroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$, and $R^{10}$ are identical or different and have the meanings stated for $R^{11}$, $R^{12}$ and $R^{13}$.

10. The polymerization process of claim 9, wherein the support is a fluorided support.

11. The polymerization process of claim 1, wherein the catalyst system comprises a metallocene catalyst system comprising a metallocene selected from the group consisting of Dimethylsilandiylbis (2-methyl-4-phenyl-1-indenyl) zirconium dimethyl; Dimethylsilandiylbis(2-methyl-4,5-benzoindenyl) zirconium dimethyl; Dimethylsilandiylbis(2-methyl-4,6-diisopropylindenyl) zirconium dimethyl; Dimethylsilandiylbis(2-ethyl-4-phenyl-1-indenyl) zirconium dimethyl; Dimethylsilandiylbis (2-ethyl-4-naphthyl-1-indenyl) zirconium dimethyl; Dimethylsilandiylbis(2-methyl-4-(1-naphthyl)-1-indenyl) zirconium dimethyl; Dimethylsilandiylbis(2-methyl-4-(2-naphthyl)-1-indenyl) zirconium dimethyl; Dimethylsilandiylbis(2-methyl-indenyl) zirconium dimethyl; Dimethylsilandiylbis(2-methyl-4,5-diisopropyl-1-indenyl) zirconium dimethyl; Dimethylsilandiylbis(2,4,6-trimethyl-1-indenyl) zirconium dimethyl; Dimethylsilandiylbis(2-methyl-1-indenyl) zirconium dimethyl; Dimethylsilandiylbis(2-ethyl-1-indenyl) zirconium dimethyl; Dimethylsilandiylbis(2,5,6-trimethyl-1-indenyl) zirconium dimethyl; Dimethylsilandiylbis (2-methyl-4-phenyl-1-indenyl) zirconium dichloride; Dimethylsilandiylbis (2-methyl-4,5-benzoindenyl) zirconium dichloride; Dimethylsilandiylbis(2-methyl-4,6-diisopropylindenyl) zirconium dichloride; Dimethylsilandiylbis(2-ethyl-4-phenyl-1-indenyl) zirconium dichloride; Dimethylsilandiylbis (2-ethyl-4-naphthyl-1-indenyl) zirconium dichloride; Dimethylsilandiylbis(2-methyl-4-(1-naphthyl)-1-indenyl) zirconium dichloride; Dimethylsilandiylbis(2-methyl-4-(2-naphthyl)-1-indenyl) zirconium dichloride; Dimethylsilandiylbis(2-methyl-indenyl) zirconium dichloride; Dimethylsilandiylbis (2-methyl-4,5-diisopropyl-1-indenyl) zirconium dichloride; Dimethylsilandiylbis(2,4,6-trimethyl-1-indenyl) zirconium dichloride; Dimethylsilandiylbis(2-methyl-1-indenyl) zirconium dichloride; Dimethylsilandiylbis(2-ethyl-1-indenyl) zirconium dichloride; Dimethylsilandiylbis(2,5,6-trimethyl-1-indenyl) zirconium dichloride; and mixtures thereof.

12. The polymerization process of claim 11, wherein the catalyst system further comprises a support.

13. The polymerization process of claim 12, wherein the support is a fluorided support.

14. A method to reduce fouling in a reactor comprising the step of:

(a) adding propylene monomers into the reactor;

(b) adding a catalyst system comprising a metallocene catalyst system;

(c) adding an antistatic agent that has been pre-contacted with a scavenger; and (d) forming a polymer in the reactor;

wherein the antistatic agent is present from about 0.3 to about 1.5 ppm based on the weight of the propylene monomers introduced into the reactor.

15. The method of claim 14, wherein the scavenger comprises an aluminum alkyl compound.

16. The method of claim 15, wherein the aluminum alkyl compound is selected from the group consisting of triethylaluminum, trimethylaluminum, tri-isobutylaluminum, tri-n-hexylaluminum, diethyl aluminum chloride, and mixtures thereof.

17. The method of claim 16, wherein the aluminum alkyl compound is triethylaluminum.

18. The method of claim 14, wherein the antistatic agent comprises a polysulfone copolymer, a polymeric polyamine, an oil-soluble sulfonic acid, or mixtures thereof, with or without a solvent.

19. The method of claim 14, wherein the antistatic agent is present from about 0.3 to about 0.8 ppm based on the weight of the propylene monomers introduced into the reactor.

20. The method of claim 14, wherein the metallocene catalyst system comprises a supported metallocene catalyst system.

21. The method of claim 14, wherein the metallocene catalyst system comprises a support and a metallocene, the metallocene represented by the following:

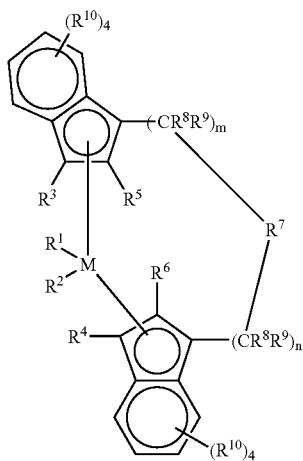

wherein M is a metal of Group 4, 5, or 6 of the Periodic Table;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, and are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

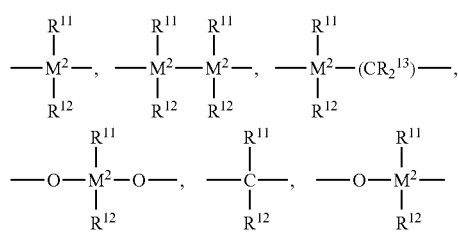

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$, and $R^{10}$ are identical or different and have the meanings stated for $R^{11}$, $R^{12}$ and $R^{13}$.

22. The method of claim 21, wherein the support is a fluorided support.

23. The method of claim 14, wherein the metallocene catalyst system comprises a metallocene selected from the group consisting of Dimethylsilandiylbis (2-methyl-4-phenyl-1-indenyl) zirconium dimethyl; Dimethylsilandiylbis(2-methyl-4,5-benzoindenyl) zirconium dimethyl; Dimethylsilandiylbis(2-methyl-4,6-diisopropylindenyl) zirconium dimethyl; Dimethylsilandiylbis(2-ethyl-4-phenyl-1-indenyl) zirconium dimethyl; Dimethylsilandiylbis (2-ethyl-4-naphthyl-1-indenyl) zirconium dimethyl; Dimethylsilandiylbis (2-methyl-4-(1-naphthyl)-1-indenyl) zirconium dimethyl; Dimethylsilandiylbis(2-methyl-4-(2-naphthyl)-1-indenyl) zirconium dimethyl; Dimethylsilandiylbis(2-methyl-indenyl) zirconium dimethyl; Dimethylsilandiylbis(2-methyl-4,5-diisopropyl-1-indenyl) zirconium dimethyl; Dimethylsilandiylbis(2,4,6-trimethyl-1-indenyl) zirconium dimethyl; Dimethylsilandiylbis(2-methyl-1-indenyl) zirconium dimethyl; Dimethylsilandiylbis(2-ethyl-1-indenyl) zirconium dimethyl; Dimethylsilandiylbis(2,5,6-trimethyl-1-indenyl) zirconium dimethyl; Dimethylsilandiylbis (2-methyl-4-phenyl-1-indenyl) zirconium dichloride; Dimethylsilandiylbis (2-methyl-4,5-benzoindenyl) zirconium dichloride; Dimethylsilandiylbis(2-methyl-4,6-diisopropylindenyl) zirconium dichloride; Dimethylsilandiylbis(2-ethyl-4-phenyl-1-indenyl) zirconium dichloride; Dimethylsilandiylbis (2-ethyl-4-naphthyl-1-indenyl) zirconium dichloride; Dimethylsilandiylbis(2-methyl-4-(1-naphthyl)-1-indenyl) zirconium dichloride; Dimethylsilandiylbis(2-methyl-4-(2-naphthyl)-1-indenyl) zirconium dichloride; Dimethylsilandiylbis(2-methyl-indenyl) zirconium dichloride; Dimethylsilandiylbis (2-methyl-4,5-diisopropyl-1-indenyl) zirconium dichloride; Dimethylsilandiylbis(2,4,6-trimethyl-1-indenyl) zirconium dichloride; Dimethylsilandiylbis(2-methyl-1-indenyl) zirconium dichloride; Dimethylsilandiylbis(2-ethyl-1-indenyl) zirconium dichloride; Dimethylsilandiylbis(2,5,6-trimethyl-1-indenyl) zirconium dichloride; and mixtures thereof.

24. The method of claim 23, wherein the metallocene catalyst system further comprises a support.

25. The method of claim 24, wherein the support is a fluorided support.

26. The method of claim 14, wherein the polymer comprises a propylene homopolymer or copolymer.

* * * * *